(12) United States Patent
McClintic et al.

(10) Patent No.: US 9,355,549 B2
(45) Date of Patent: May 31, 2016

(54) METHOD AND SYSTEM TO SCHEDULE REPAIRS FOR VEHICLES

(71) Applicant: GENERAL ELECTRIC COMPANY, Schenectady, NY (US)

(72) Inventors: Shawn Arthur McClintic, Erie, PA (US); Nicholas Roddy, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 75 days.

(21) Appl. No.: 14/032,520

(22) Filed: Sep. 20, 2013

(65) Prior Publication Data
US 2014/0088866 A1    Mar. 27, 2014

Related U.S. Application Data

(63) Continuation-in-part of application No. 10/199,717, filed on Jul. 18, 2002.

(60) Provisional application No. 61/704,691, filed on Sep. 24, 2012.

(51) Int. Cl.
| | |
|---|---|
| *G06Q 10/06* | (2012.01) |
| *G07C 5/00* | (2006.01) |
| *G01C 21/00* | (2006.01) |
| *G08B 21/18* | (2006.01) |
| *G06Q 10/00* | (2012.01) |
| *G06Q 30/02* | (2012.01) |

(52) U.S. Cl.
CPC ........... *G08B 21/18* (2013.01); *G01C 21/00* (2013.01); *G06Q 10/06* (2013.01); *G06Q 10/20* (2013.01); *G06Q 30/0206* (2013.01)

(58) Field of Classification Search
CPC ......... G06Q 10/06; G06Q 10/20; G07C 5/006
USPC ......................................................... 701/467
See application file for complete search history.

(56) References Cited

U.S. PATENT DOCUMENTS

| | | | | |
|---|---|---|---|---|
| 6,643,571 | B2 * | 11/2003 | Gotvall et al. | 701/36 |
| 7,613,617 | B2 * | 11/2009 | Williams et al. | 705/1.1 |
| 8,266,066 | B1 * | 9/2012 | Wezter et al. | 705/78 |
| 8,572,001 | B2 * | 10/2013 | Hollis | 705/337 |
| 2011/0208567 | A9 * | 8/2011 | Roddy et al. | 705/7.41 |
| 2012/0029759 | A1 * | 2/2012 | Suh et al. | 701/29 |

* cited by examiner

*Primary Examiner* — Todd Melton
(74) *Attorney, Agent, or Firm* — GE Global Patent Operation (57) ABSTRACT

Systems and methods of the invention relate to identifying a repair facility for a vehicle and scheduling a repair for the vehicle while minimizing a downtime of the vehicle. Embodiments of the invention include receiving a route of a vehicle and a repair via a request for a repair. Based on the request for a repair, an evaluation component can identify a repair facility that can handle or perform the repair defined as well as be within proximity of the vehicle. A repair component can assign a repair facility to the vehicle based on a capability of performing or handling the repair, a geographic distance from the vehicle, or an inventory of parts for the repair.

20 Claims, 5 Drawing Sheets

METHOD AND SYSTEM TO SCHEDULE REPAIRS FOR VEHICLES

CROSS-REFERENCE TO RELATED APPLICATIONS

This application claims the benefit of U.S. Provisional Application Ser. No. 61/704,691, filed Sep. 24, 2012, and entitled "VEHICLE REPAIR SYSTEMS AND METHODS." The entirety of the aforementioned application is incorporated herein by reference. This application is a continuation-in-part and claims the benefit of U.S. application Ser. No. 10/199,717, filed Jul. 18, 2002, and entitled "SYSTEM AND METHOD FOR MANAGING A FLEET OF REMOTE ASSETS."

BACKGROUND

1. Technical Field

Embodiments of the subject matter disclosed herein relate to a repair schedule system for one or more vehicles.

2. Discussion of Art

Vehicles travel along designated routes in order to transport cargo from one location to another location. During travel from location to location, vehicles, on occasion, may require a service, a maintenance procedure, or a repair. Scheduling these procedures for a vehicle while the vehicle is transporting cargo can adversely impact shipment timeliness.

It may be desirable to have a system and method that differs from those systems and methods that are currently available.

BRIEF DESCRIPTION

In an embodiment, a method is provided that includes identifying a geographic location of a vehicle and a route for the vehicle based on receipt of a request for a repair to perform on the vehicle. The method can include identifying at least one repair facility capable of performing the repair on the vehicle based at least on one or more respective distances of the at least one repair facility to the vehicle. The method can include indicating at least one of the route to the vehicle (wherein the route is a route to a selected repair facility of the at least one identified repair facility) or an identification of the vehicle and the repair to be performed to the selected repair facility.

In an embodiment, a system is provided that includes a first component configured to identify a geographic location of a vehicle and one or more waypoint locations on a route for the vehicle based on receipt of a repair request. The system can include a second component configured to select a repair facility to perform a repair identified in the repair request, the selection is based on a geographic proximity of the repair facility to the one or more waypoint locations on the route for the vehicle.

In an embodiment, a system can be provided that includes means for identifying a geographic location of a vehicle and a route for the vehicle based on receipt of a request for a repair to perform on the vehicle. The system can include means for identifying at least one repair facility capable of performing the repair on the vehicle based at least on one or more respective distances of the at least one repair facility to the vehicle. The system can include means for indicating at least one of the route to the vehicle (wherein the route is a route to a selected repair facility of the at least one identified repair facility) or an identification of the vehicle and the repair to be performed to the selected repair facility.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Embodiments of the invention relate to methods and systems for identifying a repair facility for a vehicle and scheduling a repair for the vehicle while minimizing (or at least reducing, relative to using other possible repair facilities) a downtime of the vehicle. The route of a vehicle and a repair can be received via a request for a repair. Based on the request for a repair, an evaluation component can identify a repair facility that can handle or perform the repair defined and that is within proximity of the vehicle. A repair component can assign a repair facility to the vehicle based on a capability of performing or handling the repair, a geographic distance from the vehicle, and/or an inventory of parts for the repair.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof "Hardware" refers to electronic circuits/circuitry, logic circuits/circuitry, and/or one or more processing elements (e.g., controllers or microprocessors) that is configured for the carrying out of one or more functions and/or methods (e.g., functions and/or methods as set forth herein), through execution of associated software (stored in a non-transitory electronic-readable medium, which may be part of the hardware), through the arrangement of the circuits/circuitry, and/or otherwise. "Software" refers to instructions that are readable and/or executable by hardware, stored in non-transitory electronic-readable media, which cause the hardware to perform designated functions, designated actions, and/or behave in a desired manner. "Non-transitory electronic-readable media" include, but are not limited to, non-volatile RAM, ROM, PROM, etc., a CD-ROM, a removable flash memory card, a hard disk drive, a magnetic tape, a floppy disk, and/or combinations thereof. The term "client asset" as used herein means a fixed asset or a mobile asset that is owned and/or operated by a client entity such as, for example, a railroad, a power generation company, a shipping company (e.g., land, sea, air, and/or a combination thereof), a mining equipment company, an airline, or another asset-owning and/or assetoperating entity. The term "vehicle" as used herein can be defined as an asset that is a mobile machine or a moveable transportation asset that transports at least one of a person, people, or a cargo. For instance, a vehicle can be, but is not limited to being, a rail car, an intermodal container, a locomotive, a marine vessel, mining equipment, industrial equipment, construction equipment, and the like. The term "repair facility" as used herein can be defined as a location that evaluates and/or performs a repair on a vehicle or other client asset.

The term "Car Repair Billing" (CRB) as used herein can be defined as a computer-implemented system with a portion of software, a portion of hardware, or a combination thereof that facilitates reporting and/or invoicing railroads, car owners, client asset owners, vehicle owners, lessee, lessor, among others. CRB includes Association of American Railroads (AAR) administered as well as contract billing, and another suitable billing for railroads. The term "Maintenance Management System" (MMS) as used herein can be defined as a computer-implemented system with a portion of software, a portion of hardware, or a combination thereof that facilitates analyzing repairs for a vehicle and/or auditing repairs for a vehicle to railroads, car owners, client asset owners, vehicle owners, lessee, lessor, among others. The MMS can receive repair information from a repair facility. The vehicle owner can use MMS to input repair data received from repair facility and then views, audits, pays, etc. based on the data received. The term "part" as used herein can be defined as a portion of a client asset and/or a portion of a vehicle, wherein the "part" is involved in a repair for at least one of the client asset or the vehicle. The term "ownership" as used herein can be defined as proof of legal claim to property such as a vehicle. The proof can be a title, a lease agreement, a contract, a legal document, a purchase agreement, among others. The term "repair" as used herein can be defined as a service on a vehicle, wherein the service can be a repair of a part, a replacement of a part, a maintenance of a part, a repair of a portion of the vehicle, a replacement of a portion of the vehicle, a maintenance of a portion of the vehicle, and the like.

Figure 1:
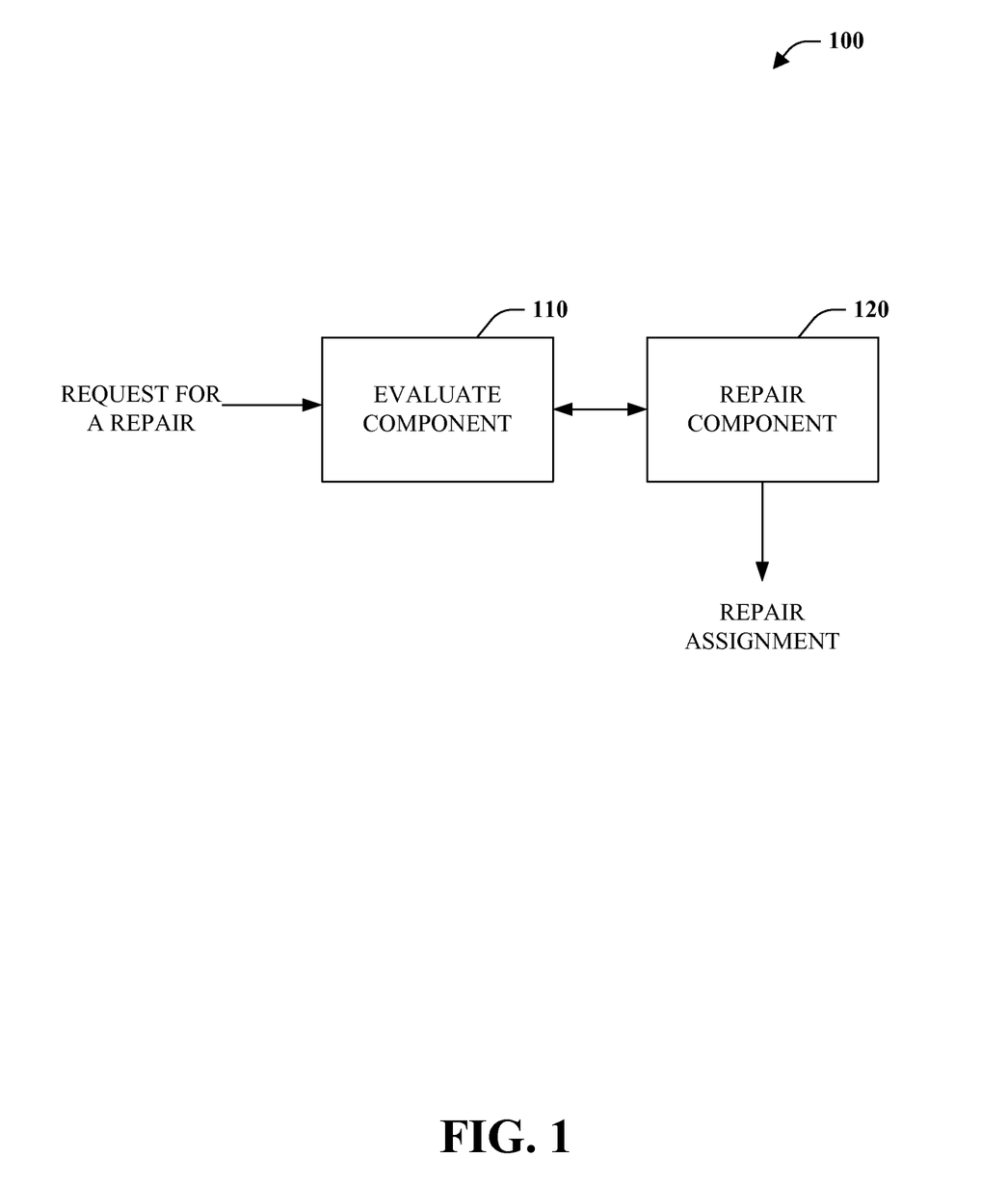
FIG. 1 is an illustration of an embodiment of a system for ascertaining a repair facility to perform a repair on a vehicle based on at least a route traveled by the vehicle.

FIG. 1 is an illustration of a system 100 for ascertaining a repair facility to perform a repair on a vehicle based on at least a route traveled by the vehicle. The system includes an evaluate component 110 that can be configured to identify a vehicle and geographic information related to the vehicle based on a request for a repair. The request for a repair can identify a repair to perform and a vehicle requiring such repair. For instance, the request for repair can be a communication in an electronic format (e.g., email, text, document, scanned document, among others), a hard-copy format, or a combination thereof. The evaluate component can locate a vehicle based on the request for repair in which the vehicle is to have a repair performed. The location of the vehicle can include a geographic location, a route (e.g., a starting location, an ending location, among others), an estimated location, an arrival time at a location, a departure time from a location, schedule information, among others. For instance, a Global Positioning Service (GPS) or other electronic components can be utilized in order to collect geographic information related to a vehicle. In another example, a wireless network, Local Area Network, Wide Area Network, the Internet, or a combination thereof can be utilized to ascertain a geographic location for a vehicle. The evaluate component can be a stand-alone component (as depicted), incorporated into the repair component, or a combination thereof.

The system includes a repair component 120 that can be configured to identify a repair facility that is capable of performing the repair identified in the request for repair and that is proximate to the vehicle (e.g., based on route projection, route being traveled, end location, projected time, current location, projected location, among others). The repair component can leverage the information from the evaluate component to ascertain a repair facility that is within a distance of the vehicle or that will be within a distance of the vehicle. The repair component can select a repair facility based on, for instance, costs for the repair, inventory of part(s) for repair, capability of performing the repair, historic information related to performed repairs, type of vehicle, type of repair, among others. In an embodiment, the repair component can utilize a distance threshold in which a maximum or minimum distance is defined between the vehicle and the repair facility at the time of the repair appointment.

The repair component can select a repair facility and schedule a repair for a vehicle, wherein the scheduling is based on the vehicle not including a cargo load, thereby eliminating potential delays to a cargo load. For instance, a repair appointment can be scheduled on a date and time for a selected repair facility when the vehicle is not in use (e.g., transporting a cargo load). The evaluate component can identify a route of a vehicle and a drop off and/or pick up of a cargo load for the vehicle. Based on the cargo load presence or absence, the repair component can select a repair facility and/or schedule a repair appointment with a repair facility. The repair component can utilize repair appointment availability as a factor when selecting a repair facility to perform a repair defined in the request for repair. The repair component generates a repair assignment, wherein the repair assignment designates a repair facility to perform the repair (defined in the request for repair), the vehicle to perform the repair, and a repair appointment for the vehicle at the repair facility. The repair component can be a stand-alone component (as depicted), incorporated into the evaluate component, or a combination thereof.

The system can be utilized with a suitable Car Repair Billing (CRB), a CRB database, Maintenance Management System (MMS), and/or a MMS database as well as an environment (e.g., user, repair shop, company, entity, corporation, among others) that employs CRB and/or MMS. For instance, the CRB database and/or the MMS database can be utilized by the evaluate component 110 in order to ascertain at least one of a cost of a repair, a repair facility location, a history of repair(s), a location of a vehicle, a route, available route(s) for a vehicle, among others.

A system can be provided that includes the evaluate component and/or repair component that provides at least one of the following: identifying a geographic location of a vehicle and a route for the vehicle based on receipt of a request for a repair to perform on the vehicle; identifying at least one repair facility capable of performing the repair on the vehicle based at least on one or more respective distances of the at least one repair facility to the vehicle; and indicating at least one of: the route to the vehicle, wherein the route is a route to a selected repair facility of the at least one identified repair facility; or an identification of the vehicle and the repair to be performed to the selected repair facility.

Figure 2:
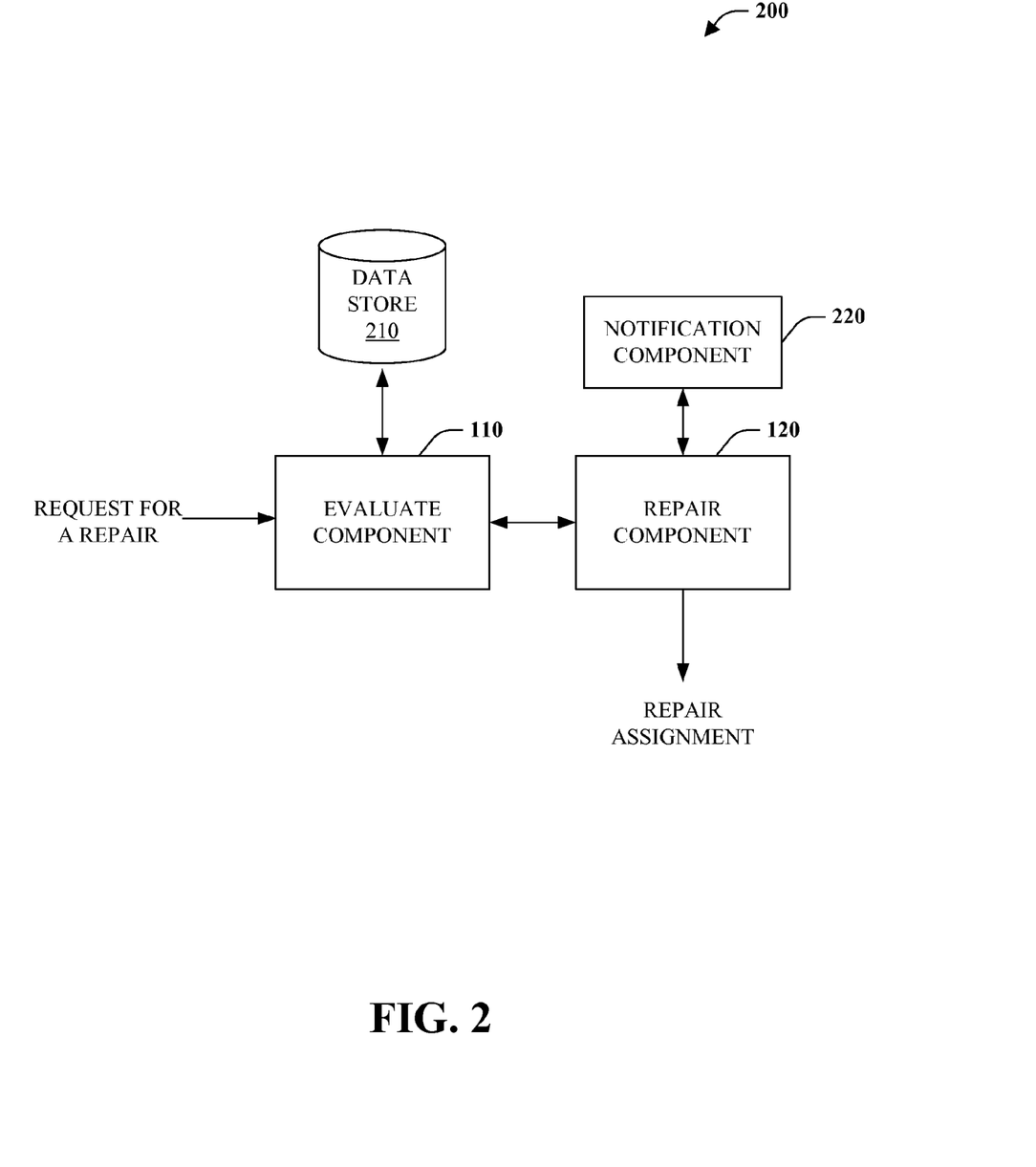
FIG. 2 is an illustration of an embodiment of a system for scheduling a repair for a vehicle at a repair facility based on a received request for the repair and a distance between the vehicle and the repair facility.

FIG. 2 is an illustration of a system 200 for scheduling a repair for a vehicle at a repair facility based on a received request for the repair and a distance between the vehicle and the repair facility. The evaluate component can receive a request for a repair and ascertain a vehicle location, a vehicle route, wherein the vehicle is identified in the request for a repair. The evaluate component can identify a location for one or more repair facilities that are capable of performing the repair defined in the request for repair. For instance, a repair facility can perform a first type of repair and not a second type of repair, whereas another repair facility can perform the first type of repair and the second repair. Based on at least the evaluate component, the repair component selects a repair facility to handle or perform the repair included with the request for the repair with a repair assignment (e.g., assigning a repair appointment to a vehicle at a repair facility to perform the repair).

The system includes a notification component 220 that can be configured to indicate at least one of the routes to the identified repair facility to the vehicle, or an identification of the vehicle and the repair to be performed to the repair facility. The notification component can communicate to at least one of the vehicle, an owner of the vehicle, an entity controlling the vehicle (e.g., driver, controller at a depot, among others), or a automated controller (e.g., self-driven, no user driver physically present, among others), a repair facility, a representative of a repair facility, an entity related to a repair facility, among others. The notification component can deliver information such as, but not limited to, a schedule of a repair, a date, a time, a vehicle identification, a repair, a cost of a repair, a cost of a part, an invoice, a direction or instruction to the repair facility, among others.

In an embodiment, the evaluate component stores information related to the systems 100, 200, 300, and/or 400 with a data store 210. The data store can include information such as, but not limited to, an invoice, route information for a vehicle, vehicle information, repair history for a vehicle, location for a repair facility, a repair cost, a type of repair, information related to a vehicle, ownership of a vehicle, an account, information related to an account, historical data related to an invoice, historical data related to a cost for a repair, information related to a repair facility, address of repair facility, among others, and/or a suitable combination thereof.

It is to be appreciated that the data store can be, for example, either volatile memory or nonvolatile memory, or can include both volatile and nonvolatile memory. The data store of the subject systems and methods is intended to comprise, without being limited to, these and other suitable types of memory. In addition, it is to be appreciated that the data store can be a server, a database, a hard drive, a flash drive, an external hard drive, a portable hard drive, a cloud-based storage, and the like.

Figure 3:
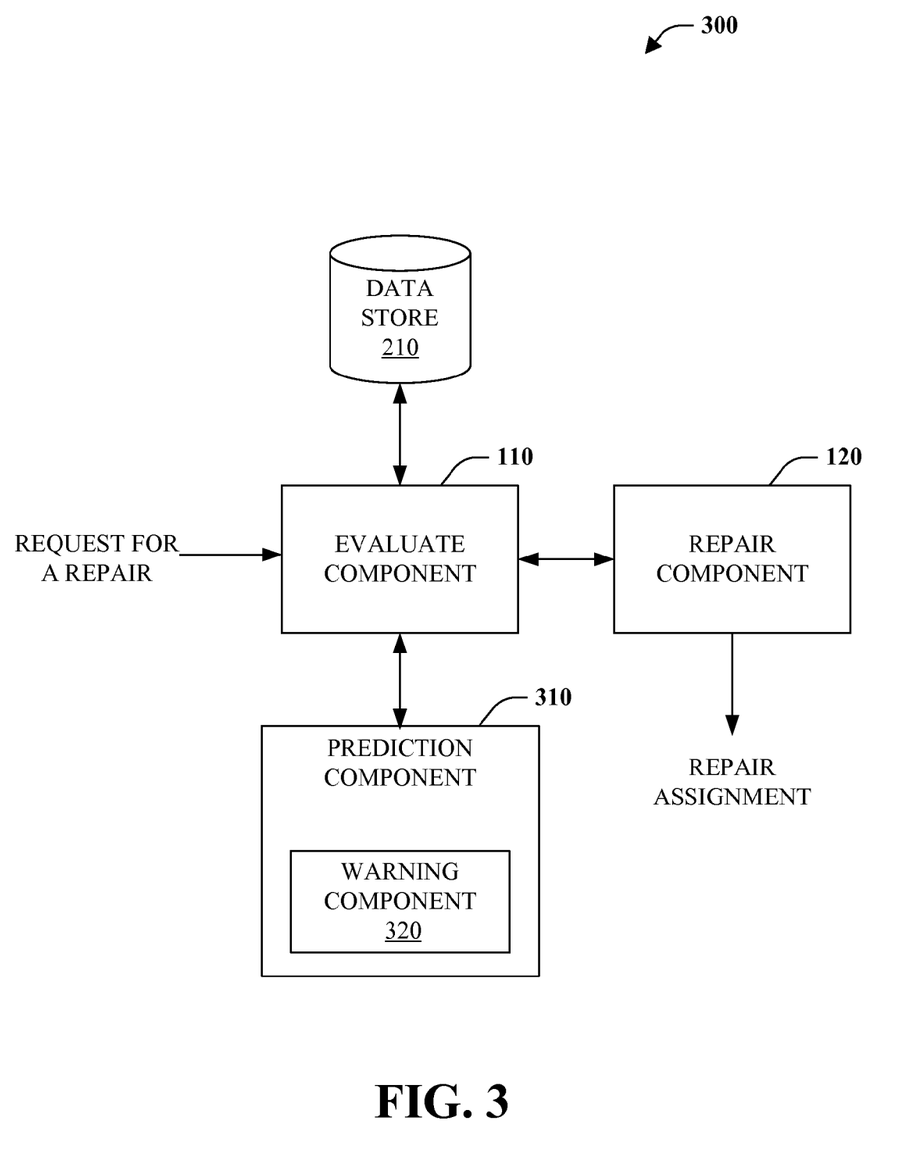
FIG. 3 is an illustration of an embodiment of a system for predicting a repair for a vehicle and selecting a repair facility to perform the predicted repair.

FIG. 3 is an illustration of a system 300 for predicting a repair for a vehicle and selecting a repair facility to perform the predicted repair. The system can include a prediction component 310 that utilizes the information aggregated by at least one of the evaluate component, the repair component, the data store, or the notification component (not shown) to predict at least one of a repair or a repair schedule. The prediction component can ascertain a repair to schedule based on at least one of a duration of time the vehicle is used or a distance traveled for the vehicle. For instance, a particular repair for a vehicle can be made based on a duration of time (e.g., hours of use, days, among others) based on a failure probability identified based on collected information from the system. The prediction component can generate a repair schedule based on a repair history of a vehicle. For instance, a repair can be made on a vehicle after a number of hours in use in which the repair can be performed on another vehicle based on the number of hours in use is approaching or has been reached. The repair schedule can include a priority of repairs based on an importance to the integrity of the vehicle. For instance, a minor repair can have a low priority and a major repair can have a high priority, wherein the minor repair does not impact mobility or use and a major repair does impact mobility or use. Although the prediction component is illustrated as a stand-alone component, the prediction component can be incorporated into the evaluate component, incorporated into the repair component, or a combination thereof.

A warning component 320 can be configured to generate a notification indicating an importance or priority of a repair. The warning component 320 can evaluate an amount of downtime for a vehicle during a repair at a repair facility and associate a level of warning for a future repair. For instance, repair A can have a vehicle out of use for a period of one day, whereas repair X can have a vehicle out of use for a month. In such an example, the warning component can communicate a notification to indicate a major repair is upcoming or predicted based on historic data (e.g., time of vehicle out of use for the repair, prediction of upcoming repair, among others). The warning component can utilize a predicted repair or a repair that is requested due to a failure. Although depicted as incorporated into the prediction component, the warning component can be a stand-alone component, incorporated into the evaluate component, incorporated into the repair component, or a combination thereof.

Figure 4:
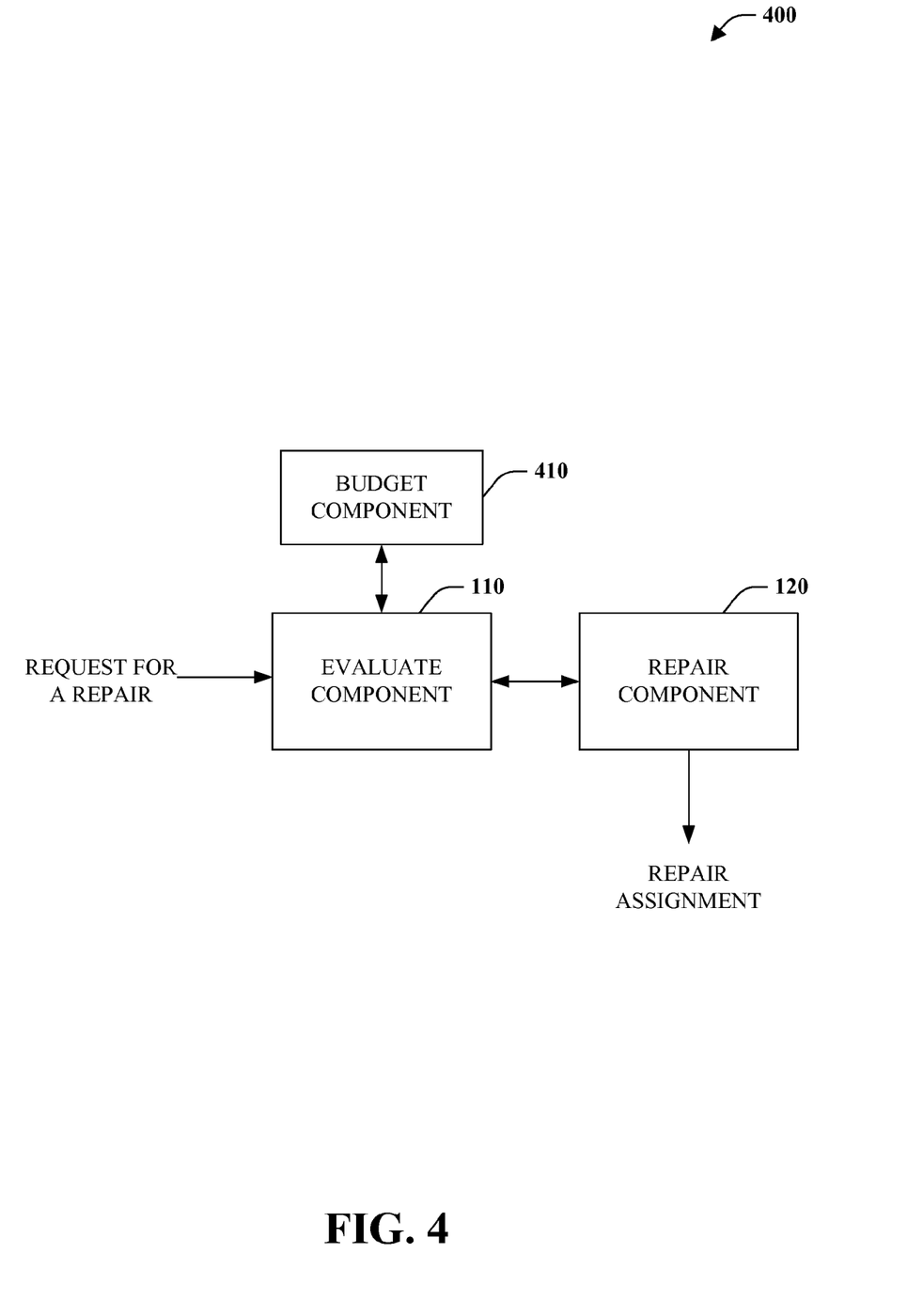
FIG. 4 is an illustration of an embodiment of a system for evaluating a financial cost for a repair of a vehicle and selecting a repair facility based on such financial cost.

FIG. 4 is an illustration of a system 400 for evaluating a financial cost for a repair of a vehicle and selecting a repair facility based on such financial cost. The system can include a budget component 410 that can be configured to evaluate a cost of a repair defined in the request for a repair. The budget component can provide real time estimates for pricing of parts and/or repair(s) for a vehicle. For instance, upon receipt of a request for a repair, the budget component can compare two or more repair facilities based on pricing for a repair defined in the request for repair. The budget component can evaluate historic pricing information for at least one of a part, a repair, a repair facility, a type of repair at a repair facility, among others. Budget component can facilitate identifying a repair facility based on a cost of a repair to be performed. In an embodiment, the budget component can include a cost associated with the amount of distance between the vehicle and a repair facility, wherein such cost can be related to gas, electricity, power, labor, employee time, among others. For instance, a distance can be shorter from the vehicle to a repair facility but the route may be uphill which can consume more resources than when traveling to another repair facility that is a larger distance from the vehicle. This cost for resources can be included when identifying a repair facility for the repair to perform on a vehicle. Although depicted as a stand-alone component, the budget component can be incorporated into the evaluate component, incorporated into the repair component, or a combination thereof.

In an embodiment, a system can be provided that includes means for identifying a geographic location of a vehicle and a route for the vehicle based on receipt of a request for a repair to perform on the vehicle (e.g., component, controller, evaluate component, system 100, among others). The system can include means for identifying at least one repair facility capable of performing the repair on the vehicle based at least on one or more respective distances of the at least one repair facility to the vehicle (e.g., component, controller, repair component, system 100, among others). The system can include means for indicating at least one of route to the vehicle (wherein the route is a route to a selected repair facility of the at least one identified repair facility) or an identification of the vehicle and the repair to be performed to the selected repair facility (e.g., component, controller, notification component, system 100, among others).

The aforementioned systems, components, (e.g., evaluate component, repair component, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

Figure 5:
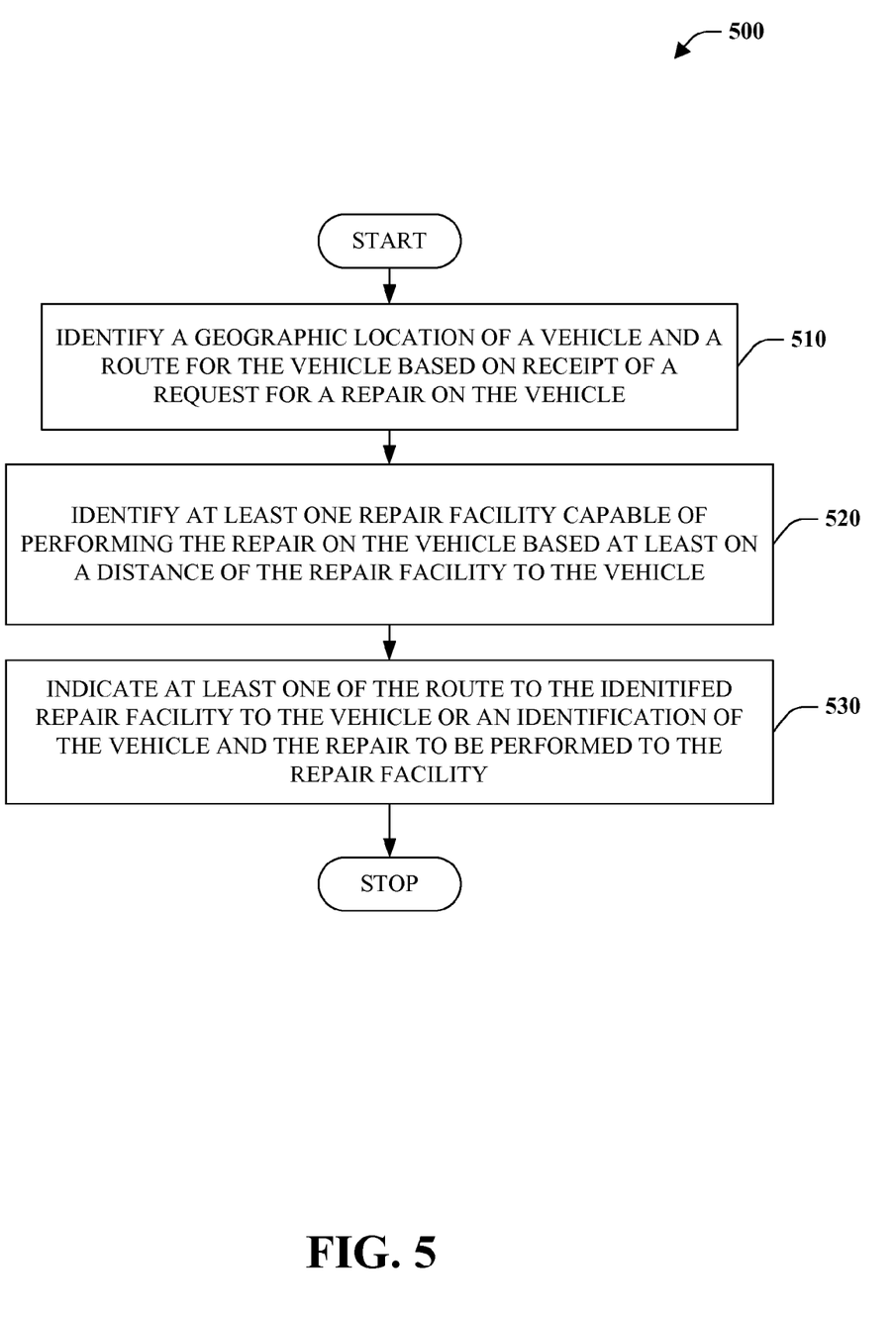
FIG. 5 illustrates a flow chart of an embodiment of a method for selecting a repair facility to perform a repair on a vehicle.

In view of the exemplary devices and elements described supra, methodologies that may be implemented in accordance with the disclosed subject matter will be better appreciated with reference to the flow chart of FIG. 5. The methodologies are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods described hereinafter. The methodologies can be implemented by a component, a controller, or a portion of a component that includes at least a processor, a memory, and an instruction stored on the memory for the processor to execute.

FIG. 5 illustrates a flow chart of a method 500 for performing a repair on a vehicle based on at least a route of travel and a repair facility location. At reference numeral 510, a geographic location of a vehicle and a route for the vehicle can be identified based on receipt of a request for a repair to perform on the vehicle. At reference numeral 520, at least one repair facility capable of performing the repair on the vehicle can be identified based at least on a distance of the repair facility to the vehicle. In another embodiment, at least one repair facility capable of performing the repair on the vehicle is identified based at least on one or more respective distances of the at least one repair facility to the vehicle. At reference numeral 530, at least one of the route to the to the vehicle (wherein the route is a route to a selected repair facility of the at least one identified repair facility) or an identification of the vehicle and the repair to be performed to the repair facility (e.g., selected repair facility) can be indicated. It is to be appreciated that if only one repair facility is identified, then the selected repair facility is "selected" by virtue of being the only one identified. As indicated above, a controller can perform the steps of method 500. For example, a controller can perform at least steps 510, 520, 530, among others. In another embodiment, a controller can perform the steps of the method 500 automatically.

The method can further include selecting the repair facility based on a financial cost of the repair or an availability at the repair facility of a part associated with the repair. The method can further include selecting the repair facility based on a cargo load of the vehicle. The method can further include selecting the repair facility based on an additional geographic location of the vehicle after a drop-off of the cargo load, and an additional route for the vehicle after the drop-off of the cargo load to the repair facility. The method can further include selecting the repair facility based on an additional geographic location of the vehicle before a pick-up of a cargo load and an additional route for the vehicle before the pick-up of the cargo load to the repair facility. The method can further include identifying a period available for at least one repair facility to perform the repair on the vehicle. The method can further include selecting the repair facility based on the vehicle not transporting the cargo load during the period. The method can further include scheduling one or more maintenance procedures for the vehicle while the vehicle is in the repair facility, and thereby to reduce downtime of the vehicle to perform the maintenance procedures at some time after the repair is complete. The method can further include mitigating a downtime for the vehicle based on the selected repair facility along the route of the vehicle. The selected repair facility is selected to reduce a downtime for the vehicle for the repair relative to using other available repair facilities for the repair.

The method can further include scheduling a repair appointment with the selected repair facility. The method can further include communicating information including at least one of the vehicle identification, the identified repair facility, a nature of the repair, an estimated time of repair, a part associated with the repair, and a cost of the repair to at least one of an owner of the vehicle, the selected repair facility, or a driver of the vehicle. The method can further include predicting a repair to schedule for the vehicle based on at least one of a duration of time the vehicle is used or a distance traveled for the vehicle. The method can further include utilizing the predicted repair as the request for repair to perform on the vehicle. The method can further include predicting a repair schedule for the vehicle based on a repair history of the vehicle. The method can further include utilizing the predicted repair as the request for repair to perform on the vehicle. The method can further include repair history that is ascertained based on at least one of a Maintenance Management System (MMS) associated with a Car Repair Billing (CRB) database.

In embodiments, one or more of the methods set forth herein are carried out (at least partially automatically) with one or more components, that is, by hardware, software, or a combination thereof configured for execution of the method. For example, in one embodiment, a method comprises identifying, with at least one component, a geographic location of a vehicle and a route for the vehicle based on receipt of a request for a repair to perform on the vehicle. The method further comprises, with the at least one component, identifying at least one repair facility capable of performing the repair on the vehicle based at least on one or more respective distances of the at least one repair facility to the vehicle. The method further comprises indicating, with the at least one component, at least one of the route to the vehicle, wherein the route is a route to a selected repair facility of the at least one identified repair facility and/or an identification of the vehicle and the repair to be performed to the selected repair facility. ("With at least one component" means all the steps may be carried out by one component, that each step may be carried out by a different component, or that some steps are carried out by one component and other steps are carried out by one or more other, different components.)

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A method, comprising:
   identifying, with a first component, a geographic location of a vehicle and a route of the vehicle responsive to a request for a repair to perform on the vehicle, wherein the request is electronically communicated to the first component;
   identifying, with a second component, a set of repair facilities capable of performing the repair on the vehicle based at least on respective distances of facilities from the set of repair facilities to the geographic location of the vehicle relative to a distance threshold;
   scheduling the repair on the vehicle with a selected repair facility from the set of repair facilities based at least in part of the route of the vehicle; and
   notifying at least one of the vehicle of an amended route that includes a route to the selected repair facility based on a scheduled repair, or the selected repair facility with an identification of the vehicle and the repair to be performed at the selected repair facility.

2. The method of claim 1, further comprising selecting the selected repair facility based on at least one of a financial cost of the repair or an availability at the selected repair facility of a part associated with the repair.

3. The method of claim 1, wherein scheduling the repair based at least in part on the route of the vehicle comprises selecting the selected repair facility based on a cargo load of the vehicle.

4. The method of claim 3, further comprising selecting the selected repair facility based on an additional geographic location of the vehicle after a drop-off of the cargo load, and an additional route for the vehicle to the selected repair facility after the drop-off of the cargo load.

5. The method of claim 3, further comprising selecting the selected repair facility based on an additional geographic location of the vehicle before a pick-up of the cargo load and an additional route for the vehicle to the selected repair facility before the pick-up of the cargo load.

6. The method of claim 3, further comprising identifying a period available for the selected repair facility to perform the repair on the vehicle.

7. The method of claim 6, further comprising selecting the selected repair facility based on the vehicle not transporting the cargo load during the period.

8. The method of claim 1, further comprising scheduling one or more maintenance procedures for the vehicle while the vehicle is in the repair facility, and thereby to reduce a future downtime of the vehicle to perform an additional maintenance procedure.

9. The method of claim 1, further comprising mitigating a downtime for the vehicle by selecting the selected repair facility along the route of the vehicle.

10. The method of claim 1, further comprising scheduling a repair appointment with the selected repair facility based at least in part on appointment availability.

11. The method of claim 1, further comprising communicating information including at least one of the vehicle identification, the at least one identified repair facility, a nature of the repair, an estimated time of repair, a part associated with the repair, or a cost of the repair to at least one of an owner of the vehicle, the selected repair facility, or a driver of the vehicle.

12. The method of claim 1, further comprising:
   predicting a repair to schedule for the vehicle based on at least one of a duration of time the vehicle is used or a distance traveled for the vehicle; and
   utilizing the predicted repair as the request for repair to perform on the vehicle.

13. The method of claim 1, further comprising:
   predicting a repair schedule for the vehicle based on a repair history of the vehicle; and
   utilizing the predicted repair schedule as the request for repair to perform on the vehicle.

14. The method of claim 13, wherein the repair history is ascertained based on a Maintenance Management System associated with a Car Repair Billing database.

15. A system comprising:
   a first component configured to identify a geographic location of a vehicle and a set of waypoint locations on a route of the vehicle responsive to a repair request; and
   a second component configured to select a repair facility to perform a repair identified in the repair request, wherein the selection of the repair facility is based at least in part on a geographic proximity of the repair facility to the geographic location of the vehicle or a waypoint location from the set of waypoint locations on the route of the vehicle.

16. The system of claim 15, wherein the set of waypoint locations include at least one of a location for a pick-up of a cargo, a location for a drop-off of the cargo, a distribution center, a fueling location, a transport center, a railway yard, a depot, or a vehicle station.

17. The system of claim 15, further comprising a third component configured to schedule an appointment at the repair facility to perform the repair identified in the repair request.

18. The system of claim 17, wherein the second component is configured to select the repair facility based on the geographic proximity of the repair facility to a geographic proximity of the vehicle at a time when the vehicle is not transporting a cargo.

19. The system of claim 15, further comprising:
   a fourth component configured to predict a repair for the vehicle based on at least one of a duration of time the vehicle is used or a distance the vehicle is traveled; and
   wherein the second component is configured to select the repair facility to perform the repair identified by the predicted repair for the vehicle.

20. A system, comprising:
   means for identifying a geographic location of a vehicle and a route of the vehicle responsive to a request for a repair to perform on the vehicle;

means for identifying a set of repair facilities capable of performing the repair on the vehicle based at least on respective distances of facilities from the set of repair facilities to the vehicle relative to a distance threshold;
means for scheduling the repair on the vehicle with a selected repair facility from the set of repair facilities based at least in part of the route of the vehicle; and
means for indicating at least one of:
 an amended route to the vehicle, wherein the amended route includes a route to the selected repair facility; or
 an identification of the vehicle and the repair to be performed to the selected repair facility.

\* \* \* \* \*

UNITED STATES PATENT AND TRADEMARK OFFICE
CERTIFICATE OF CORRECTION

PATENT NO.       : 9,355,549 B2                          Page 1 of 1
APPLICATION NO.  : 14/032520
DATED            : May 31, 2016
INVENTOR(S)      : McClintic et al.

It is certified that error appears in the above-identified patent and that said Letters Patent is hereby corrected as shown below:

In the specification,

In Column 2, Line 46, delete "thereof" and insert -- thereof. --, therefor.

Signed and Sealed this
Sixteenth Day of August, 2016

Michelle K. Lee
*Director of the United States Patent and Trademark Office*